United States Patent [19]
Bailey et al.

[11] 3,941,396
[45] Mar. 2, 1976

[54] SEAL FOR ROTATING MEANS

[75] Inventors: John M. Bailey, Dunlap; Michael K. Stratton, Peoria, both of Ill.

[73] Assignee: Caterpillar Tractor Co., Peoria, Ill.

[22] Filed: Aug. 15, 1974

[21] Appl. No.: 497,657

[52] U.S. Cl. ............................................. 277/134
[51] Int. Cl.² ......................................... F16J 15/40
[58] Field of Search ........... 277/134, 133, 237, 203, 277/204, 234

[56] References Cited
UNITED STATES PATENTS

| | | | |
|---|---|---|---|
| 2,804,325 | 8/1957 | Riesing | 277/134 |
| 2,958,551 | 11/1960 | Rogers | 277/134 |

FOREIGN PATENTS OR APPLICATIONS

| | | | |
|---|---|---|---|
| 657,966 | 10/1951 | United Kingdom | 277/134 |

*Primary Examiner*—Robert I. Smith
*Attorney, Agent, or Firm*—Phillips, Moore, Weissenberger Lempio & Strabala

[57] ABSTRACT

There is disclosed sealing means for effecting a seal between two adjacent members, one of which rotates relative to the other, comprising a convoluted resilient metal ring bonded to an elastomeric support member; the convoluted wall of the ring provides radial resiliency whereby dimensional displacement of the sealed members may be accommodated and a substantially leak-free fit obtained, thereby preventing fluid leakage between the members, while at the same time allowing the seal to tolerate high peripheral speeds between the members and to resist and compensate for wear. An elastomeric support member acts as a supplemental seal to the ring and provides additional elasticity for accomodating lateral displacement of the rotatable member, while maintaining an effective fluid-tight seal.

15 Claims, 7 Drawing Figures

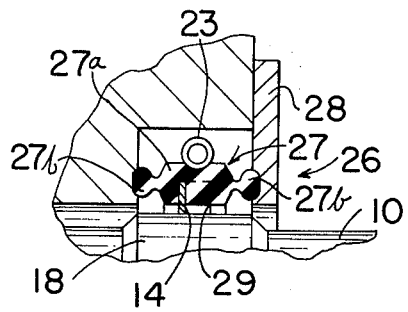
Fig_4_
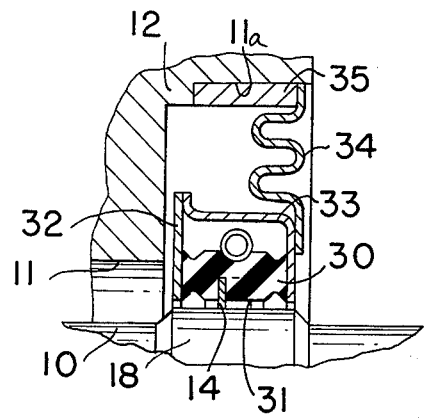
Fig_5_
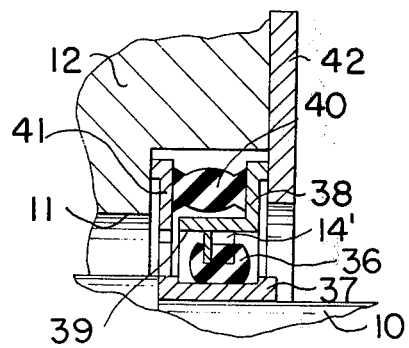
Fig_6_
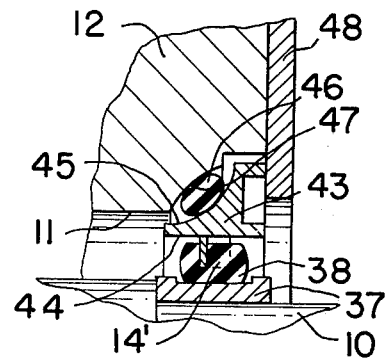
Fig_7_

SEAL FOR ROTATING MEANS

BACKGROUND OF THE INVENTION

This invention relates to sealing means between adjacent relatively rotatable members. More particularly, this invention relates to durable sealing means for rotating shafts such as crank shafts of diesel engines whereby fluid leakage between the rotating shaft and adjacent fluid-containing means may effectively be prevented.

It is well known in the art to provide rotating-shaft seals for preventing leakage of fluid, most usually lubricant, between the shaft and an associated fluid-containing chamber, as well as for preventing the entry of dust or other foreign matter into this chamber. Although many of these prior art seals are relatively satisfactory with respect either to durability or to sealing characteristics, typical shaft seals in present use do not possess both these qualities to a satisfactory degree for many applications.

For example, problems are frequently encountered in providing satisfactory front and rear shaft seals for the crankshaft of diesel engines. It is important that these seals prevent leakage of lubricating oil from the engine compartment, out of which the crankshaft extends, as well as prevent entry of foreign matter into the engine compartment. However, both the large diameter of the crankshaft and the loads imposed thereupon create operating conditions under which conventional sealing means are frequently not effective in terms of preventing leakage of lubricant, or are not satisfactory in terms of durability.

The large diameter of the crankshaft, required for adequate strength, results in a high peripheral speed between the seals and the crankshaft which tends to shorten the life of the seals, particularly the rear seal between the crankshaft and flywheel housing. Owing to the time required to replace a failed seal because of the necessity of removing various parts, such as the flywheel, to gain access to these seals, it is highly desirable that these shaft seals be extremely durable, preferably having a wear life of at least 20,000 hours of heavy duty engine operation.

Additionally, as a result of the loads imposed on the crankshaft during operation, the crankshaft goes through exursions as great as about 0.020 radially and at least equal amount axially; if adequate sealing is to be obtained, the seal must follow the crankshaft through all of these motions. Further, the crankshaft seals are frequently subjected to differential pressure caused for example by internal crankcase pressures or by a head of oil being built up within the engine. It is highly desirable that sealing means be provided which substantially eliminate lubricant leakage under all these conditions, whether or not the engine is operating.

Typical shaft seals in present use include piston ring-type seals, such as described in U.S. Pat. No. 3,211,467 and lip type seals. In the piston ring-type seals, the ring is seated very closely in a groove, whereby leakage of lubricant is reduced depending on the closeness of the fit of the ring in the groove. Since relative motion must be permitted between ring and groove, the fit is never perfect, and some leakage inevitably occurs, particularly when the engine is not operating. Such leakage is generally undesirable, and in some applications, such as generators, not permissible for satisfactory engine operation. In the lip-type seal, an elastomeric member is fitted against the crankshaft to provide a generally effective seal against lubricant leakage. However, this type of seal has minimal durability, and the action of the crankshaft rubbing against the elastomer frequently results in early seal failure, thereby necessitating time-consuming seal changes. Also, this type of seal is very sensitive to pressure differentials between adjoining sealed chambers, such as frequently occur, for example, between the crankcase and transmission compartment or atmosphere in piston engines because of blow-by pressure around the piston rings. The susceptibility of this type of seal to leakage under such pressure conditions renders it unsatisfactory for use with certain transmissions.

SUMMARY AND OBJECTS OF THE INVENTION

Broadly, the invention comprises sealing means, including a convoluted resilient metal ring bonded to an elastomeric member to provide a seal between two members in applications where one such member rotates relative to the other. The convoluted wall of the ring provides resiliency whereby dimensional displacements of the sealed components may be accommodated, thereby preventing fluid leakage between the two members, while at the same time allowing the seal to tolerate high peripheral speeds between the seal and rotating member, and to resist and compensate for wear. The elastomeric member acts as a supplemental seal to the ring and provides additional elasticity for accommodating displacement of the rotating member while maintaining an effective seal.

Accordingly, it is an object of the invention to provide sealing means between two components, one of which rotates relatively to the other, whereby fluid leakage between these components may be substantially prevented both during and in the absence of rotation.

It is an additional object of this invention to provide sealing means between two components, one of which rotates relatively to the other, whereby fluid leakage in the presence of high pressure differentials exerted against the sealing means.

It is another object of this invention to provide durable, inexpensive sealing means having a high resistance to high peripheral speed and an extended wear-life for effecting a seal between two components, one of which rotates relatively to the other, whereby fluid leakage between these components may be substantially prevented.

BRIEF DESCRIPTION OF THE DRAWINGS

FIGS. 4–7 are elevational views in section of alternate embodiments of the invention.

DETAILED DESCRIPTION OF THE DRAWINGS

Figure 1:
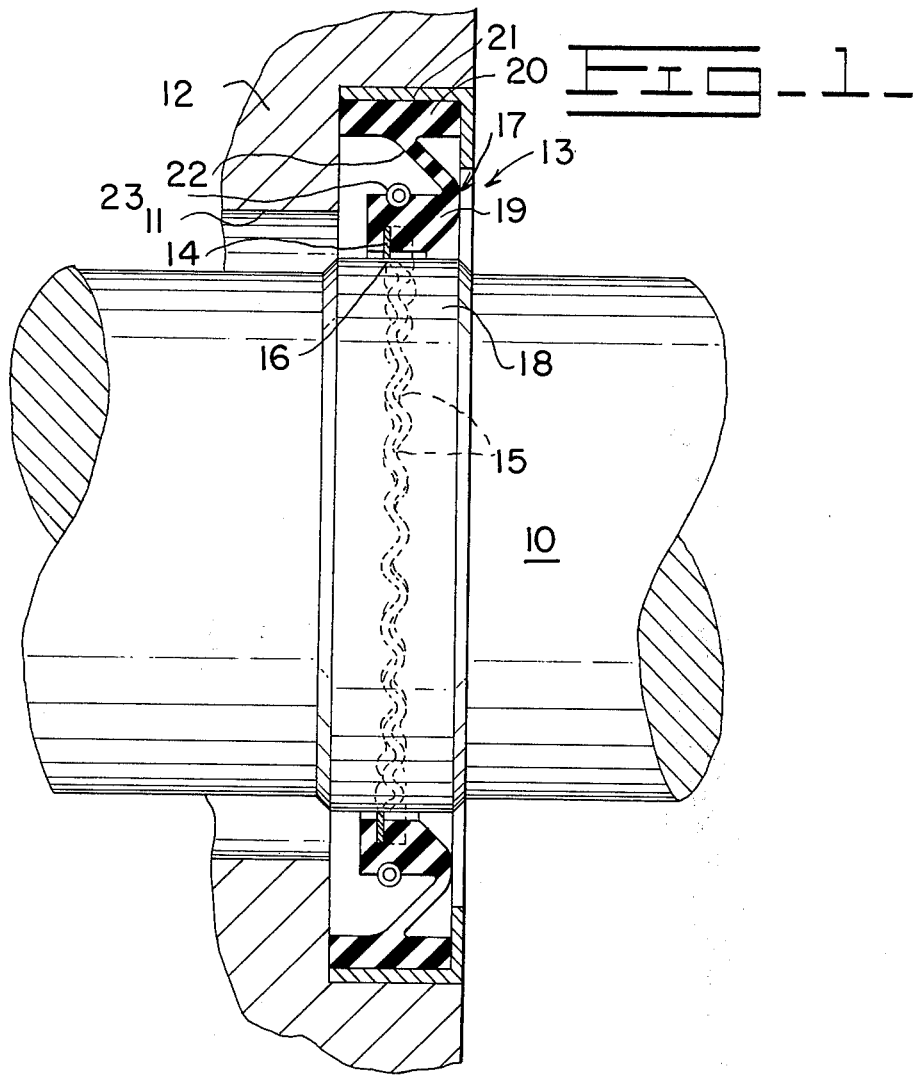
FIG. 1 is a side elevational view of a rotatable shaft assembly embodying sealing means in accordance with this invention.

With particular reference to FIG. 1, a rotatable shaft 10 extends through an opening on bore 11 in a housing 12 and is provided with sealing means indicated generally at 13 for effecting a seal between shaft 10 and stationary housing 12. Sealing means 13 generally includes a metallic ring 14 having convolutions 15 having an inner sealing surface 16 defining the inner diameter of the ring member. The ring member is bonded to a static elastomeric diaphragm-like support member 17 so that surface 16 of ring 14 is slidable against sealing surface 18 which is for example a crankshaft wear sleeve of rotatable shaft 10 during rotation thereof. Diaphragm 17 includes an inner hub or flange 19 bonded to ring 14 and an outer flange 20 secured to a cup-shaped retainer member 21, and is preferably provided with an innerconnecting flexible webbed portion 22. If desired, a garter spring 23 may be provided to increase radial loading of ring 14 on surface 18 of shaft 10.

Figures 2, 3:
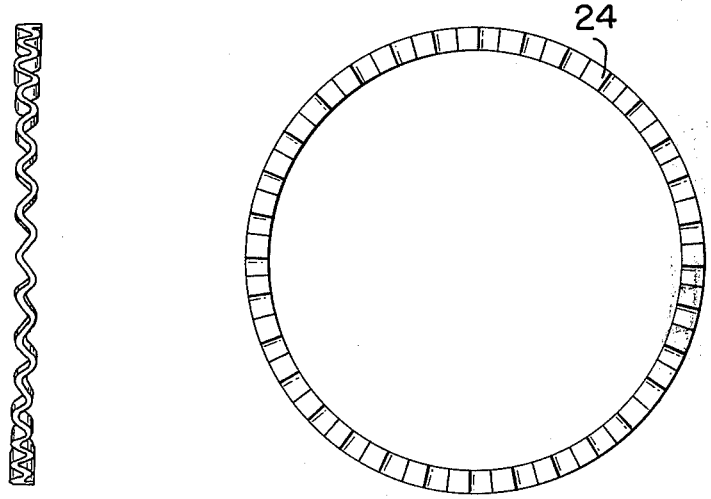
FIGS. 2 and 3 are front and side elevations respectively of the ring member of the sealing means of FIG. 1.

With particular reference to FIGS. 2 and 3, ring 14 is shown having a substantially circular configuration conforming to shaft 10 defined by a radially extending wall 24 having a series of substantially regular convolutions 15 which will provide ring 14 with a desired spring-like resiliency to accomodate the diameter of wear ring 18 and also any wear of the ring 14. The internal dimensions of ring 14 are ground or otherwise formed to provide a substantially perfect leak-free fit around wear ring 18 of shaft 10 when sealing means 13 are in place. Preferably, ring 14 is of a metal such as hardened steel or chrome-plated steel to provide a predictably extensive wear-life.

In practice, ring 14 is formed having internal dimensions somewhat less than those of shaft 10. Owing to its resilient characteristics, ring 14 may then be expanded to fit over shaft 10 when sealing means 13 is fitted in place. Ring 14 thus acts as a spring loaded against shaft 10 to provide a substantially perfect fit therearound. Diaphragm 17 at the same time prevents leakage around the periphery of ring 13, even during displacement of shaft 10 due to the flexible characteristics of diaphragm 17.

By these sealing means, radial excursions of the shaft 10 may be accommodated by flexure of webbed portion 22 of diaphragm 16, while axial motion of shaft 10 is accommodated by either flexure of diaphragm 16 or relative axial motion between ring 14 and surface 18 of shaft 10. A positive seal is thus obtained, which is minimally susceptible to pressure differentials and yet is very durable.

With particular reference to FIG. 4, an alternate ring mounting means for the ring 14 is generally indicated at 26, with identical elements as in the previous embodiment designated by the same numeral.

As illustrated in FIG. 4, the ring mounting means 26 include an elastomeric annular member 27 disposed around the shaft 10. The member 27 includes a central body portion 27a and a pair of end portions 27b connected thereto by means of necked down portions. The member 27 is compressed between the stationary housing 12 and a housing cover plate 28, and includes an inner circumferential groove 29 for receiving the ring 14 between the member 27 and the shaft 10. A garter spring 23 may be disposed about the outer circumference of the member 27 if it is desired to increase the radial forces exerted on the ring 14.

Radial excursions of the shaft 10 are compensated for by the flexing between the central portion 27a and end portions 27b of the elastomeric member 27, while axial motion of the shaft 10 is accommodated by relative motion of the ring 14 and the surface 18 of the shaft 10.

As illustrated in FIG. 5, the ring mounting means include an elastomeric annular member 30 annularly mounted about the shaft 10 and including an inner circumferential groove 31 for receiving the ring 14 between the member 30 and the shaft 10. The mounting means include a housing assembly disposed within the stationary housing 12 and including a vertical plate 32 and a cup-shaped retainer member 33 secured to a bellows or static elastomeric diaphragm-like member 34. The elastomeric member 30 is molded to the housing assembly 32, 33. Radial excursions of the shaft 10 thus cause member 30 and bellows 34 to flex in compensation, while axial movement of the shaft 10 is compensated for by relative motion of the ring 14 and the surface 18 of the shaft 10, or by flexing of the bellows 34, or both. A ring 35 secured to the bellows 34 secures the assembly within bore 11a of housing 12.

With reference to FIG. 6, another alternate embodiment of the seal assembly and ring mounting means is generally illustrated. In this arrangement a seal ring 14' is arranged to seal at its outer diameters. As illustrated in FIG. 6, the ring-mounting means includes an elastomeric annular member 36 disposed between the ring 14' and a ring member 37 non-rotatably mounted on shaft 10. The seal means further includes an annular member 38 having a cylindrical surface 39 sealingly engaged by the outer diameter of ring 14'. An elastomeric annular member 40 mounts ring member 38 with respect to a ring member 41. These members are mounted within bore 11a of housing 12 and retained in place by means of an end plate 42.

Turning to FIG. 7, the seal ring 14' is mounted as in FIG. 6 for engagement with a seal ring member 43 having an inner cylindrical surface 44. The member 43 includes an inclined surface 45 against which an elastomeric torus 46 is biased while confined against an inclined surface 47. An end plate 48 retains the assembly in place within the housing 12.

What is claimed is:

1. A seal assembly for sealing between inner and outer concentrically mounted relative rotatable members, comprising in combination:
    inner and outer annular seal members having radially directed sealing faces disposed in sealing engagement and mounted for relative rotation therebetween; and,
    one of said annular seal members comprising convoluted radially resilient metallic ring means for biasing said seal faces into sealing engagement.

2. The seal assembly of claim 1 including resilient mounting means for mounting one of said seal members for radial displacement thereof.

3. The seal assembly of claim 1 comprising resilient mounting means for mounting said outer seal member for radial displacement thereof.

4. The seal assembly of claim 1 wherein said inner seal member is mounted for rotation with a rotatable shaft extending through an opening in a housing; and, said outer seal member is mounted adjacent said opening in said housing.

5. The seal assembly of claim 4 wherein said outer member is said convoluted metallic ring means; and, resilient mounting means including an elastomeric annular member having a groove receiving said convoluted metallic ring.

6. The seal assembly of claim 4 wherein said convoluted metallic ring means is mounted in an elastomeric ring member.

7. The seal assembly of claim 6 wherein said convoluted metallic ring means in said inner seal member, and said elastomeric member is mounted on said shaft for supporting said convoluted metallic ring member.

8. The seal assembly of claim 6 wherein said convoluted metallic ring means is said outer seal member.

9. The seal assembly of claim 8 wherein said elastomeric member is sealed by diaphragm means to said housing.

10. The seal assembly of claim 6 wherein outer seal member is supported by an annular elastomeric member in said housing.

11. Sealing means for effecting a fluid-tight seal between a pair of relatively rotatable members, comprising:

metallic radially resilient ring means having an inner sealing face conforming to a cylindrical face of a rotatable member and having sufficient resiliency to be expanded over said face of said rotatable member and thereby spring-loaded against said face member to obtain a substantially leak-free fit between said ring means and said rotatable member; and an impervious annular elastomeric member secured to said ring means and to the other member for preventing fluid leakage around the outer periphery of said ring means and for accommodating radial and axial displacement of said rotatable member.

12. The sealing means of claim 11, further including a garter spring radially loaded against said ring means.

13. The sealing means of claim 11, wherein said rotatable member is a crankshaft and said other member is a crankcase.

14. The sealing means of claim 11, wherein said ring means comprises a convoluted ring member.

15. The sealing means of claim 14, wherein said ring member is defined by radially extending wall means having axially extending convolutions.

* * * * *